UNITED STATES PATENT OFFICE.

FRIEDRICH SEIDENSCHNUR, OF CHARLOTTENBURG, GERMANY.

SOLUTION FOR PRESERVING WOOD.

1,248,022.  Specification of Letters Patent.  Patented Nov. 27, 1917.

No Drawing.  Application filed February 3, 1912. Serial No. 675,279.

*To all whom it may concern:*

Be it known that I, FRIEDRICH SEIDENSCHNUR, chemist, a subject of the King of Prussia and the German Emperor, residing at 12 Holtzendorffstreet, Charlottenburg, near Berlin, Kingdom of Prussia, German Empire, have invented certain new and useful Improvements in Solutions for Preserving Wood, of which the following is a specification.

The present invention refers to a composition of matter for preserving porous organic substances especially wood. The composition according to the present invention contains basic inorganic zinc salts which are insoluble in water alone dissolved in an aqueous solution of aluminium salts. As zinc salt I may use zinc oxychlorid. As aluminium salt I have found suitable aluminium sulfate. The present composition has the advantage that it contains large amounts of zinc salts, because the basic zinc compounds which are insoluble in water alone may be dissolved abundantly in an aqueous solution of aluminium salts. Solutions of aluminium salts have generally the disadvantage of splitting off free acid which exerts a deleterious effect on wood. This injury is prevented by the use of the present composition of matter because any free acid split off from aluminium salts would be neutralized by the basic zinc compounds.

For preserving the wood with the present solution I exhaust the air from the wood and force the solution into the pores of the wood under pressure.

I may use the following proportions:

Water _____ 500 parts by weight
Zinc oxychlorid _____ 10 parts by weight
Aluminium sulfate _____ 25 parts by weight

I claim:

1. Solution for preserving wood composed of water, zinc hydroxid and aluminium sulfate, free of other soluble zinc salts.

2. Solution for preserving wood composed of water, a basic zinc compound insoluble by itself in water and aluminium sulfate free of other soluble zinc salts.

In testimony whereof I have affixed my signature in presence of two witnesses.

FRIEDRICH SEIDENSCHNUR.

Witnesses:
 HENRY HASPER,
 WOLDEMAR HAUPT.